United States Patent
Chen

(10) Patent No.: US 7,634,628 B2
(45) Date of Patent: Dec. 15, 2009

(54) METHOD FOR PROCESSING CACHE DATA

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 414 days.

(21) Appl. No.: 11/605,247

(22) Filed: Nov. 29, 2006

(65) Prior Publication Data

US 2008/0126710 A1 May 29, 2008

(51) Int. Cl.
G06F 12/00 (2006.01)
G06F 15/16 (2006.01)
G06F 11/00 (2006.01)

(52) U.S. Cl. .............. 711/162; 709/218; 709/219; 711/113; 711/141; 711/135; 714/6

(58) Field of Classification Search ............... 711/162, 711/124, E12.023, 113, 141, 135; 709/218, 709/219; 714/6

See application file for complete search history.

(56) References Cited

U.S. PATENT DOCUMENTS 7,383,329 B2 * 6/2008 Erickson ............... 709/223
2002/0092010 A1 * 7/2002 Fiske ..................... 717/168

* cited by examiner

Primary Examiner—Christian P Chace
Assistant Examiner—Mehdi Namazi
(74) Attorney, Agent, or Firm—Bacon & Thomas, PLLC

(57) ABSTRACT

The present invention discloses a method for processing cache data, which is used in a dual redundant server system having a console end and a redundant control end. The console end mirrors a cache data saved in the console end into a mirrored cache data and sends the mirrored cache data to the redundant control end through a transmission unit. If the console end determines that the redundant control end cannot save the mirrored cache data, the console end will flush the cache data into a hard disk installed at the console end.

4 Claims, 5 Drawing Sheets

METHOD FOR PROCESSING CACHE DATA

FIELD OF THE INVENTION

The present invention relates to a method for processing cache data, and more particularly to a method for processing cache data in a dual redundant server system.

BACKGROUND OF THE INVENTION

The present world enters into an era with high-developed information technologies and blooming electronic industry, and thus various different high-tech products are derived from computers, and mobile communication technologies are developed rapidly, and all these are indispensable to our life and shorten the time and space between people. With the popularity and high utility rate of the present electronic products (such as computers) and communication technologies and the incentives promoted by manufacturers, the market competition becomes increasingly severer, and manufacturers spare no effort to find new ways of attracting consumers to use their products. Since consumers have high demands on the electronic products and communication services, it is one of the important indexes to show whether or not the high-tech products and communication technologies of a country lead other countries by the electronic products and communication service provided by that particular country.

Server is a high-performance computer primarily used as a node of a network for saving or processing data on the network, and a server is generally composed of components such as a processor, a hard disk, a memory and a system bus, etc, and these components are designed specifically for network applications, so that a server can have better processing capability, stability, reliability, safety, expandability, and manageability. Particularly in the present advancement of information technologies and increased demand for information flow, many companies or organizations use servers to provide related information and services including downloads and mails. As a result, servers are used extensively, and thus it is an important issue to find a way of providing an environment with more reliable and humanistic information application services as well as a server with better processing capability and reliability.

To prevent the failure of a server due to various different causes and an interrupt of data access or network service, some manufacturers develop a so-called "dual redundant server system". Referring to FIG. 1, the system includes a console end 1 and a redundant control end 2, wherein the console end 1 transmits or receives data packets between a server system and a network, such that the server system can transmit and receive data packets (related information and network information including downloads and mails) through the network to provide related network information services.

To avoid the failure of the console end 1 and an interrupt of service of the server system, the console end 1 updates data synchronously with the redundant control end 2, when the console end 1 is under a normal operation state. If the console end 1 is disabled, the redundant control end 2 will take over immediately and become a new console end, so that the server system 1 can continue its service.

However, after a first record of cache data A saved in a cache memory 10 of the console end 1 is mirrored into a first record of mirrored cache data A', the first record of mirrored cache data A' is saved in another cache memory 20 (as shown in FIG. 1) of the redundant control end 2. After a second record of cache data B saved in the cache memory 10 is mirrored into a second record of mirrored cache data B', the second record of mirrored cache data B' is saved in the other cache memory 20 (as shown in FIG. 2). After a third record of cache data C saved in the cache memory 10 is mirrored into a third record of mirrored cache data C' and the third record of mirrored cache data C' cannot be saved in the other cache memory 20 (as shown in FIG. 3), the redundant control end 2 will discard the third record of mirrored cache data C', and thus the contents stored in the cache memory 10 and the other cache memory 20 will be inconsistent.

SUMMARY OF THE INVENTION

In view of the foregoing shortcomings of the prior art, the inventor of the present invention based on years of experience in the related industry to conduct extensive researches and experiments, and finally developed a method for processing cache data in accordance with the present invention, in hope of overcoming the shortcomings of the prior art.

Therefore, it is a primary objective of the present invention to provide a method for processing cache data in a dual redundant server system, such that when a console end of the dual redundant server system processes and converts a cache data stored in its cache memory into a mirrored cache data by a mirroring mechanism, the console end sends the mirrored cache data to a redundant control end of the dual redundant server system through a transmission unit. If the console end receives a mirrored cache data that cannot be saved at the redundant control end, then the console end will flush the cache data directly into a corresponding hard disk at the console end to avoid a loss of mirrored cache data.

To make it easier for our examiner to understand the objective, structure, innovative features, and performance of the invention, we use a preferred embodiment with attached drawings for the detailed description of the invention.

DETAILED DESCRIPTION OF THE PREFERRED EMBODIMENTS

Figure 1:
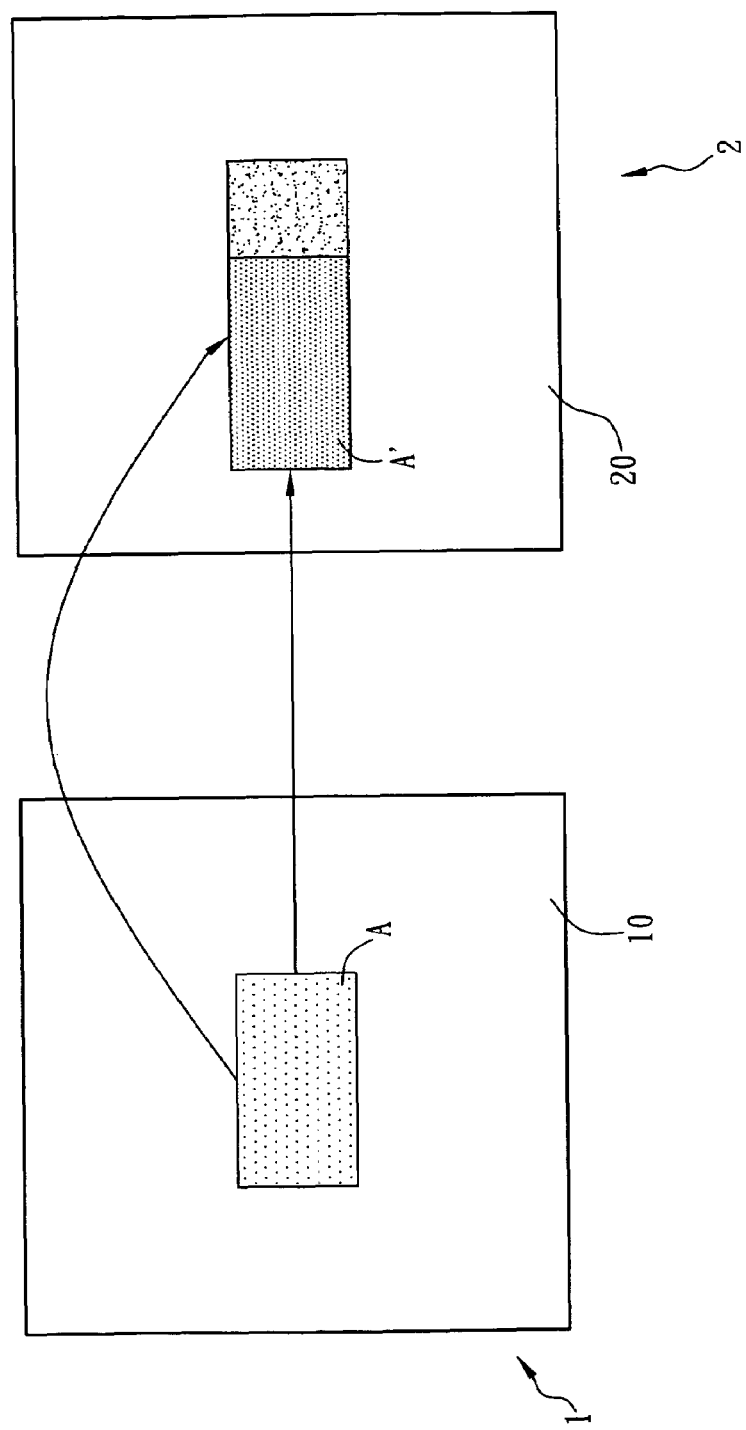
FIG. 1 is a schematic view of saving a first record of mirrored cache data into another memory in accordance with a prior art.
Figure 2:
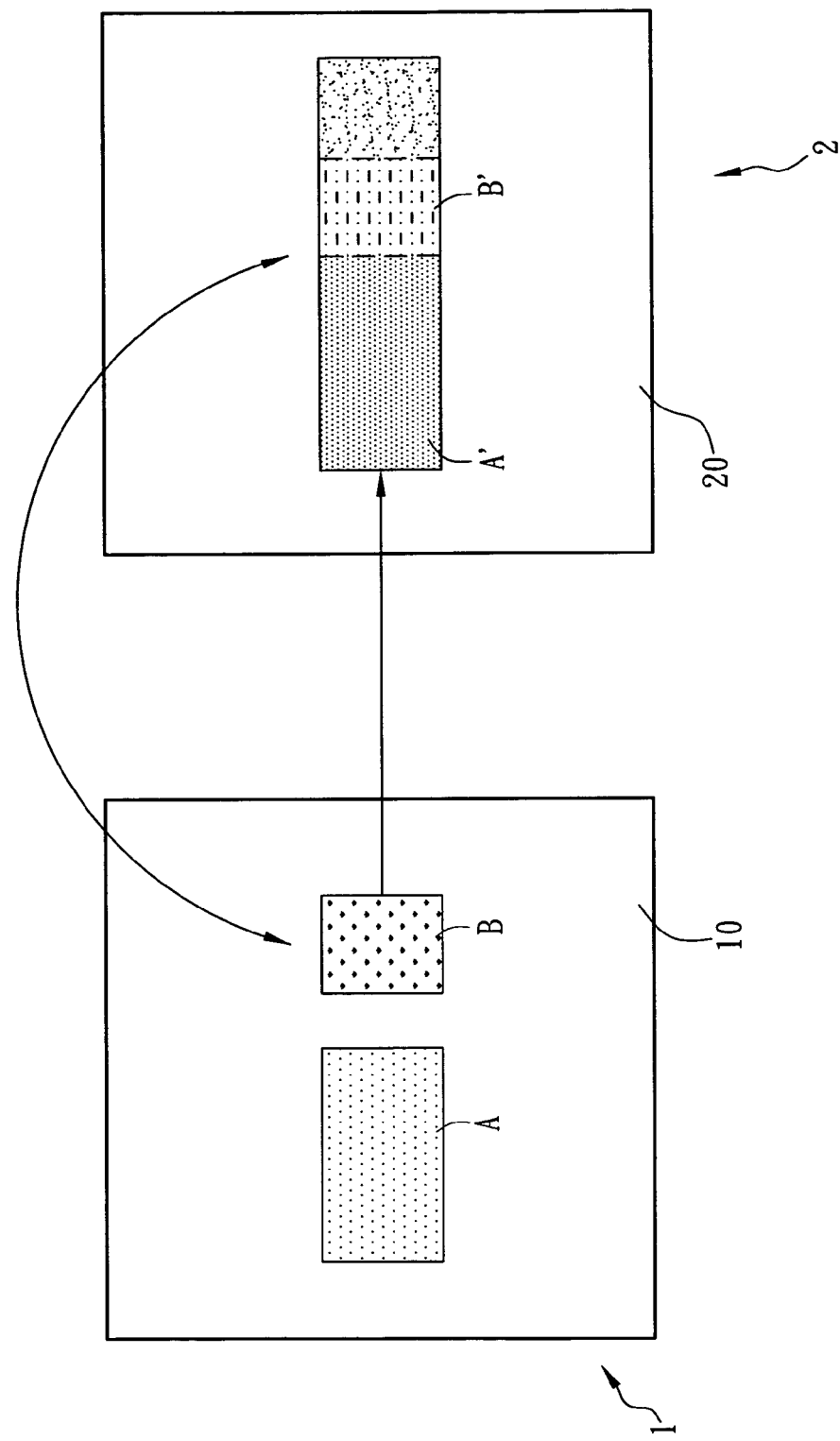
FIG. 2 is a schematic view of saving a second record of mirrored cache data into another memory in accordance with a prior art.
Figure 3:
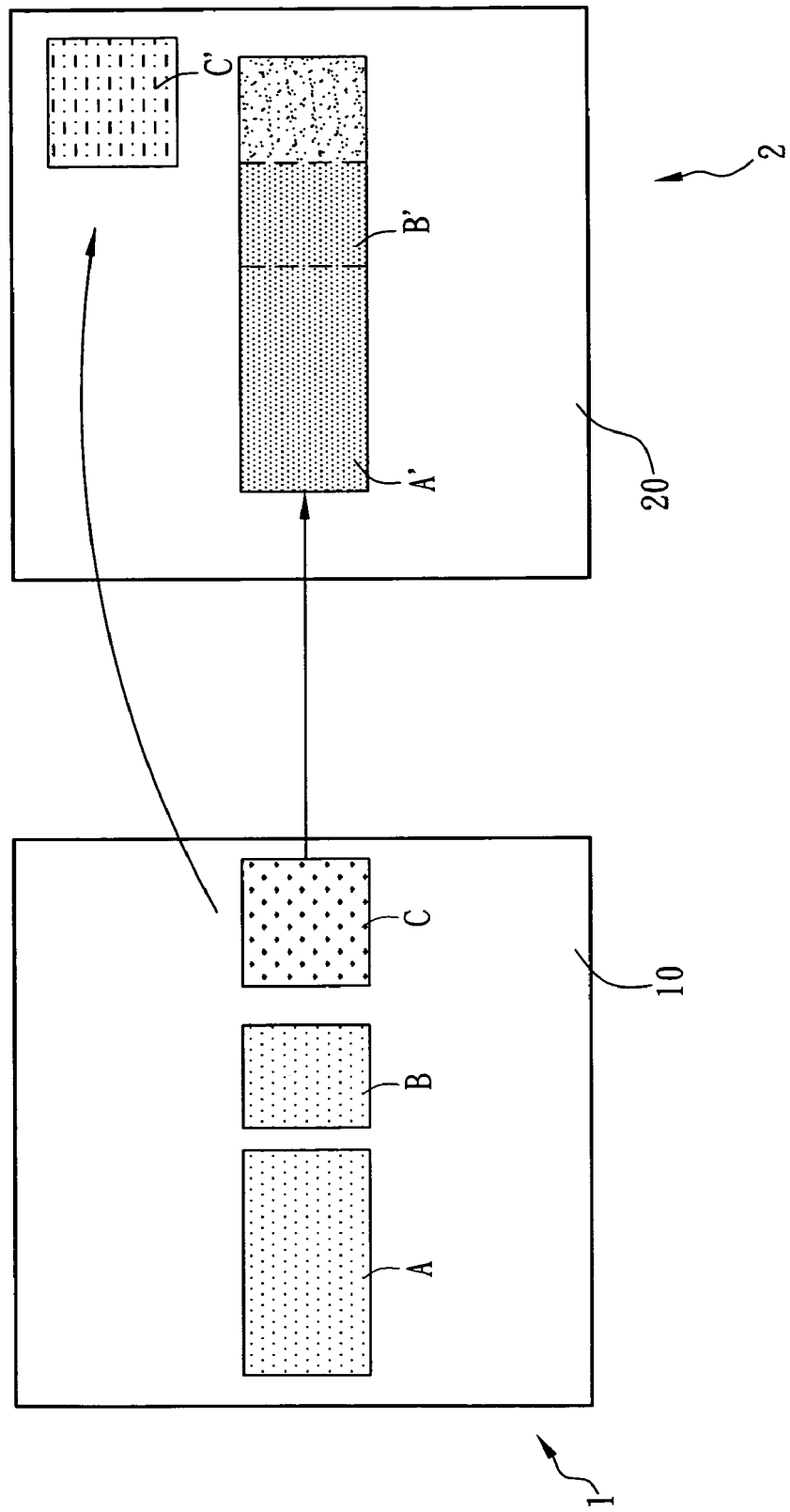
FIG. 3 is a schematic view of saving a third record of mirrored cache data into another memory in accordance with a prior art.
Figure 4:
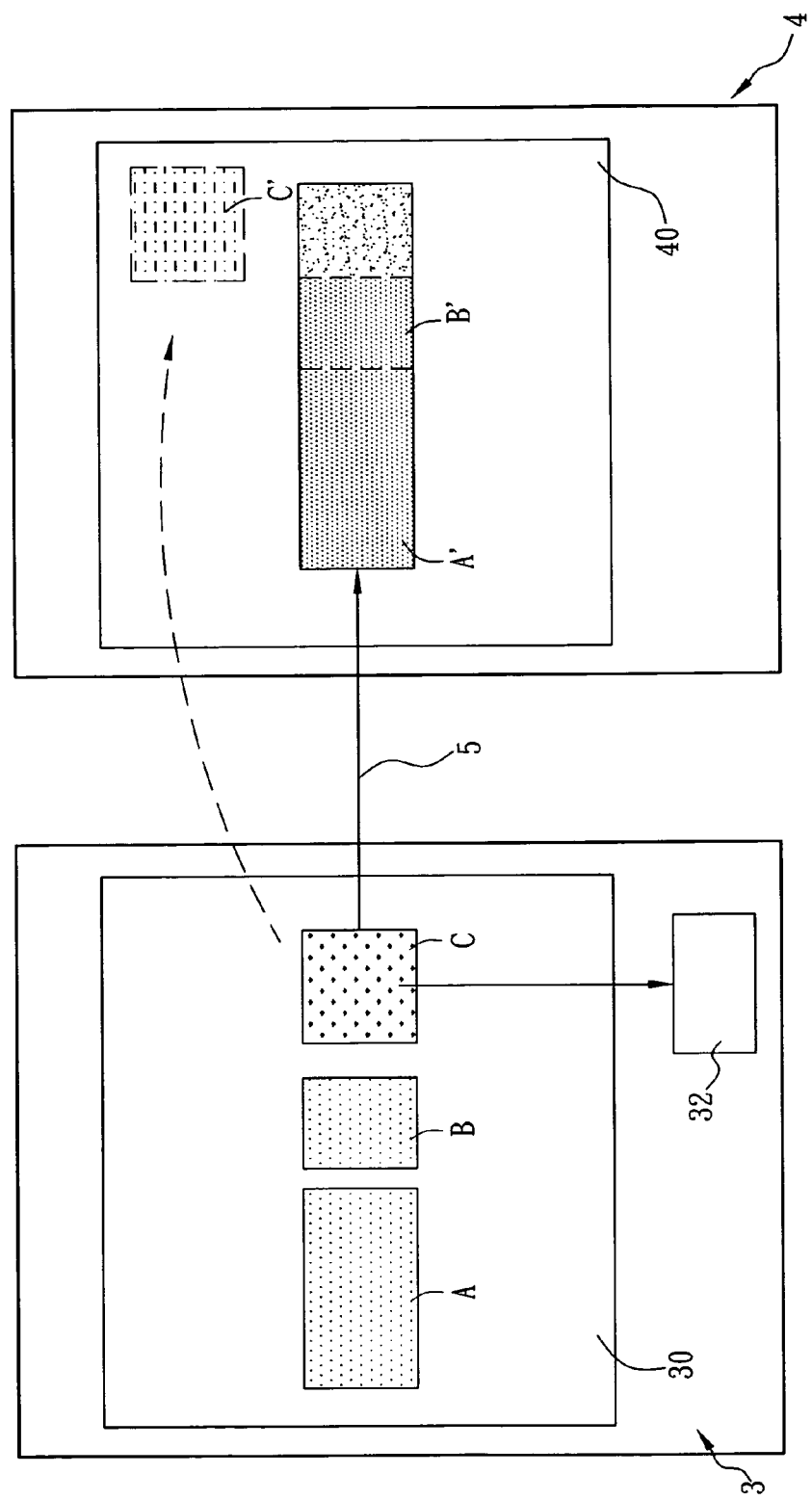
FIG. 4 a schematic view of saving a mirrored cache data into another memory or a hard disk in accordance with the present invention.
Figure 5:
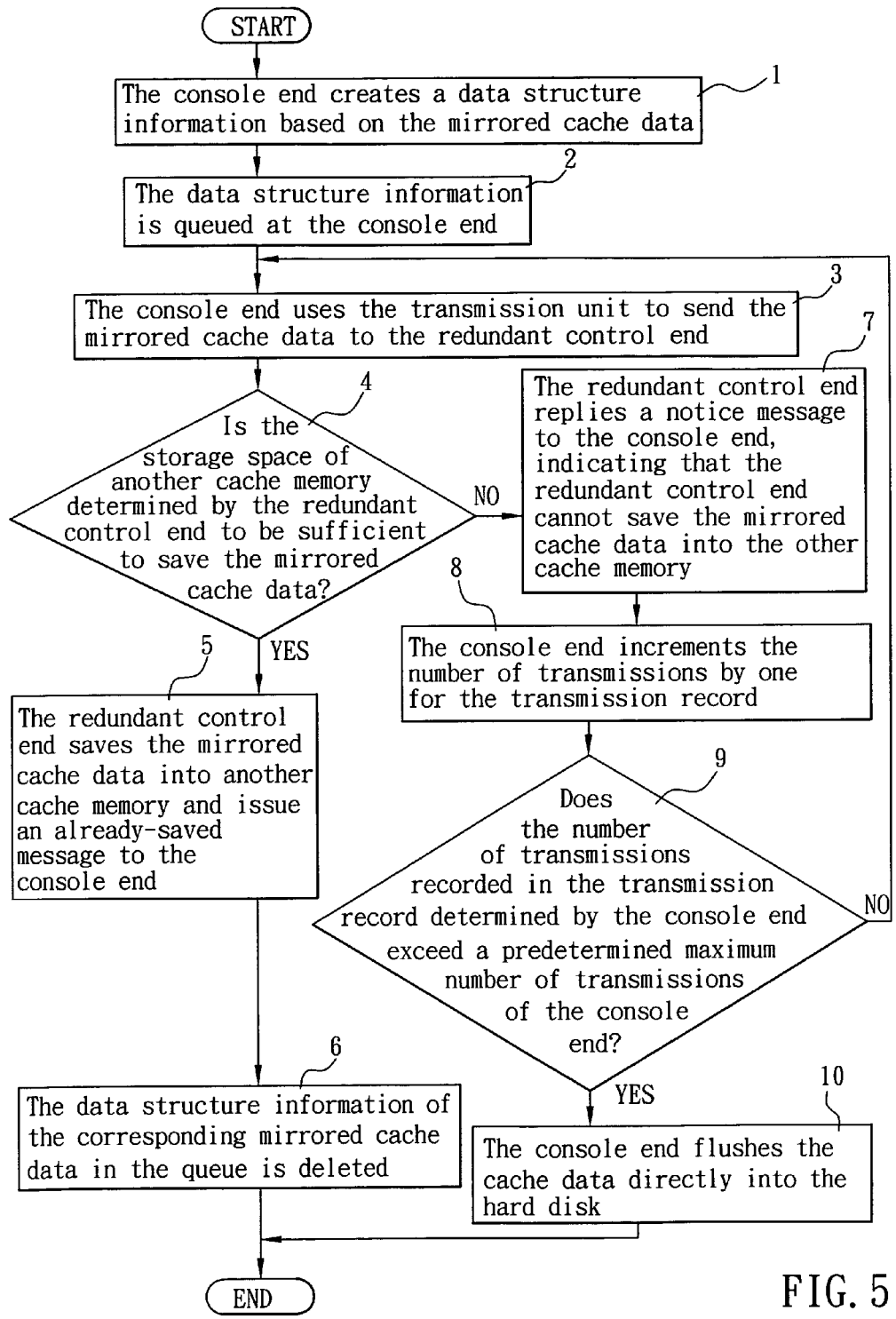
FIG. 5 is a flow chart of the present invention.

Referring to FIG. 4 for a method for processing cache data in a redundant server system, the system includes a console end 3 and a redundant control end 4. The console end 3 has a cache memory 30 for storing cache data, and the redundant control end 4 has another cache memory 40, and the console end 3 uses a mirroring mechanism to process and convert the cache data into a mirrored cache data as shown in FIG. 5, such that if the console end 3 needs to send the mirrored cache data to the redundant control end 4 through a transmission unit 5 and save the mirrored cache data in the other cache memory 40, the console end 3 and the redundant control end 4 will carry out the following steps:

Step (1): The console end 3 creates a data structure information based on the mirrored cache data, and the data structure information comprises a transmission record, and the content of the transmission record includes a number of times that the console end 3 sends the mirrored cache data to the redundant control end 4 and cannot save the mirrored cache data in the other cache memory 40.

Step (2): The data structure information is queued at the console end 3.

Step (3): The console end 3 sends the mirrored cache data to the redundant control end 4 through the transmission unit 5 and processes other following mirrored cache data and wait for a reply from the redundant control end 4.

Step (4): If the redundant control end 4 receives the mirrored cache data, then a storage space of the other cache memory 40 will be determined whether or not it is sufficient to save the mirrored cache data. The redundant control end 4 adds the capacity of the currently saved data of the other cache memory 40 and the capacity of the mirrored cache data to obtain a comparing data capacity, and then compares the maximum data capacity of the cache memory 40 with the size of the data capacity to determine whether or not the storage space of the other cache memory 40 is sufficient to save the mirrored cache data. If the maximum data capacity of the other cache memory 40 is greater than the comparing data capacity, then go to Step (5), or else go to Step (7).

Step (5): The redundant control end 4 saves the mirrored cache data into the other cache memory 40 and issues an already-saved message to the control end 3 to indicate that the redundant control end 4 has saved the mirrored cache data.

Step (6): The console end 3 receives the already-saved message, and then delete the data structure information of the corresponding mirrored cache data in the queue, and then ends the procedure.

Step (7): If the redundant control end 4 cannot save the mirrored cache data to the other cache memory 40, then the redundant control end 4 will reply a notice message to the console end 3;

Step (8): If the console end 3 receives the notice message, then the console end 3 will increment the number of transmissions by one for the transmission record;

Step (9): The console end 3 determines whether or not the number of transmissions recorded in the transmission record exceeds a predetermined maximum number of transmissions of the console end 3. If the console end 3 determines that the number of transmissions recorded in the transmission record has exceeded the maximum number of transmissions, then go to Step (10), or else go to Step (3);

Step (10): The console end 3 flushes the cache data directly into a hard disk 32 at the console end 3, and then ends the procedure.

Referring to FIG. 4 for the status that the other cache memory 40 cannot save the mirrored cache data, the first record of cache data A and second record of cache data B saved in the cache memory 30 are processed and converted into a first record of mirrored cache data A' and a second record of mirrored cache data B' respectively and saved into the other cache memory 40 according to the aforementioned procedure of the present invention. After the third record of cache data C saved in the cache memory 30 is mirrored into a third record of mirrored cache data C', the redundant control end 4 determines that the storage space of the other cache memory 40 is insufficient to save the third record of mirrored cache data C' (as indicated by the dotted line in FIG. 4), and then the console end 3 will flush the third record of cache data C into the hard disk 32 to avoid a loss of cache data.

In the present invention, the data structure information further includes a cache data identification header and a content index, and the cache data identification header further includes a device identity data, a block address and a data length of the cache data, etc, wherein the device identity data is a serial number of the hard disk containing the cache data, and the block address is a block address of the hard disk containing the cache data, and the content index is a storing address of the cache memory 30 for storing the cache data. If the console end 3 determines that the number of transmissions recorded in the transmission record has exceeded the maximum number of transmissions, the console end 3 will read the storing address of the cache memory 30 corresponding to content index based on the content index to obtain the cache data, and then the console end 3 flushes the cache data into a block address of the hard disk corresponding to the cache data identification header according to the cache data identification header.

In summation of the description above, the following three mechanisms are provided, if the console end 3 cannot save the mirrored cache data into the other cache memory 40:

1. The console end 3 can resend the mirrored cache data;
2. The console end 3 has a limitation of a maximum number of transmissions for resending the mirrored cache data; and
3. The console end 3 will flush the cache data into the hard disk 32 if the mirrored cache data cannot be resent.

Further, the following three mechanisms are provided, if the redundant control end 4 receives the mirrored cache data:

1. The redundant control end 4 can determine the capacity for storing the other cache memory 40;
2. The redundant control end 4 determines whether or not the mirrored cache data can be saved in the other cache memory 40;
3. If the redundant control end 4 saves the mirrored cache data into the other cache memory 40, the redundant control end 4 replies an already-saved message to the console end 3. If the mirrored cache data is saved in the other cache memory 40, the notice message will be replied to the console end 3.

The present invention has been shown and described in detail, various modifications and improvements thereof will become readily apparent to those skilled in the art. Accordingly, the spirit and scope of the present invention is to be construed broadly and limited only by the appended claims and not by the foregoing specification.

What is claimed is:

1. A method for processing cache data, which is applied to a redundant server system having a console end and a redundant control end, and said console end has a cache memory for storing a cache data, and said redundant control end has another cache memory, and said redundant server system processes a procedure comprising the steps of:

said console end processing and convening said cache data into a mirrored cache data by a mirroring mechanism;

said console end transmitting said mirrored cache data to said redundant control end by a transmission unit; and when said console end determines that said another cache memory of said redundant control end cannot save said mirrored cache data, then said cache data will be flushed into a hard disk corresponding to said cache data at said console end;

wherein said console end processes and converts said cache data into said mirrored cache data by said transmission unit through a procedure comprising the steps of:

said console end creating a data structure information based on said mirrored cache data, wherein said data structure information includes a transmission record, and the content recorded in said transmission record is the number of transmissions that said console end sends said mirrored cache data to said redundant control end and cannot save said mirrored cache data into said another cache memory;

said data structure information being queued at said console end; and said console end processing a procedure based on the steps of sending said mirrored cache data to said redundant control end;

wherein when said redundant control end receives said mirrored cache data, said redundant control end further processes the steps of:

determining whether or not the storage space of said another cache memory is sufficient to save said mirrored cache data; and saving said mirrored cache data into said another cache memory, when said redundant control end determines that the storage space of said another cache memory is sufficient to save said mirrored cache data, and using said transmission unit to issue an already-saved message to said console end to indicate that said redundant control end has already saved said mirrored cache data;

wherein when said redundant control end cannot save said mirrored cache data into said another cache memory, said redundant control end will reply a notice message to said console end, indicating that said mirrored cache data cannot be saved;

wherein when said console end receives said notice message, said console end further processes the steps of:

increasing said number of transmissions by one in said transmission record;

determining whether or not said number of transmissions recorded in said transmission record exceeds a predetermined maximum number of transmissions of said console end; and determining that said redundant control end cannot save said mirrored cache data when said number of transmissions recorded in said transmission record has exceeded said maximum number of transmissions; and wherein said data structure information further includes a cache data identification header and a content index, and when said console end determines that said number of transmissions recorded in said transmission record has exceeded said maximum number of transmissions, said console end will flush said cache data into said hard disk according to a procedure comprising the steps of:

saving said cache data in a storing address of said cache memory based on said content index, and reading said storing address of said cache memory to obtain said cache data; and obtaining a serial number of said hard disk containing said cache data and a block address set by said cache data identification header from a device identity data set by said cache data identification header, and obtaining a block address of said hard disk containing said cache data and a data length said cache data stored in said hard disk and recorded by said cache data identification header, for flushing said cache data into said block address of said hard disk corresponding to said cache data identification header.

2. The method of claim 1, wherein when said console end determines that said number of transmissions recorded in said transmission record has not exceeded said maximum number of transmissions, said console end will process a procedure based on the steps of said transmission unit sending said minored cache data to said redundant control end.

3. The method of claim 1, wherein said redundant control end determines whether or not the storage space of said another cache memory is sufficient to save said mirrored cache data according to a procedure comprising the steps of:

adding a currently saved data capacity of said another cache memory and a data capacity of said mirrored cache data to obtain a comparing data capacity;

comparing said maximum data capacity of said another cache memory with the size of said data capacity; and when said maximum data capacity of said another cache memory is greater than said comparing data capacity, then said minored cache data will be saved in said another cache memory.

4. The method of claim 3, wherein when said maximum data capacity of said another cache memory is greater than said comparing data capacity, then said redundant control end will process according to a procedure of which said redundant control end cannot save minored cache data into said another cache memory.

* * * * *

UNITED STATES PATENT AND TRADEMARK OFFICE
CERTIFICATE OF CORRECTION

| | | |
|---|---|---|
| PATENT NO. | : 7,634,628 B2 | Page 1 of 1 |
| APPLICATION NO. | : 11/605247 | |
| DATED | : December 15, 2009 | |
| INVENTOR(S) | : Chih-Wei Chen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 430 days.

Signed and Sealed this

Twenty-first Day of December, 2010

David J. Kappos
*Director of the United States Patent and Trademark Office*